March 26, 1957 G. R. BERGMAN 2,786,988
FAULT LOCALIZING DEVICE IN COMPOSED SYSTEMS
Filed Jan. 17, 1955 2 Sheets-Sheet 1
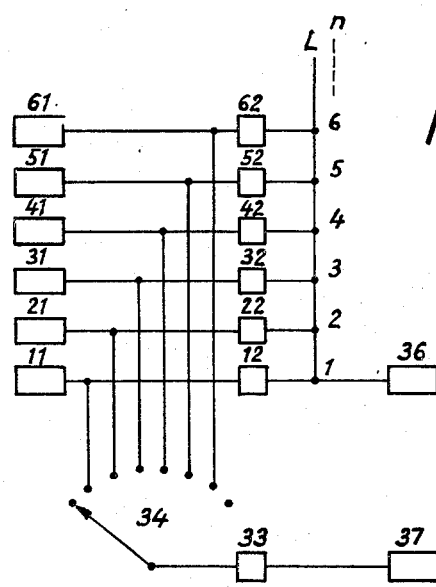
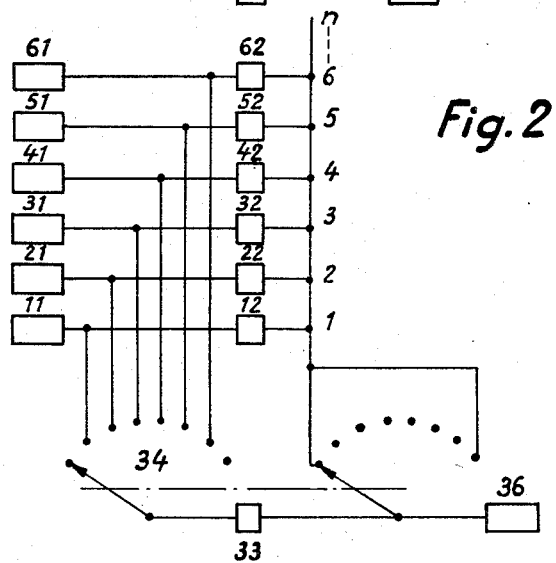
INVENTOR
GUSTAV RUBEN BERGMAN
ATTORNEY

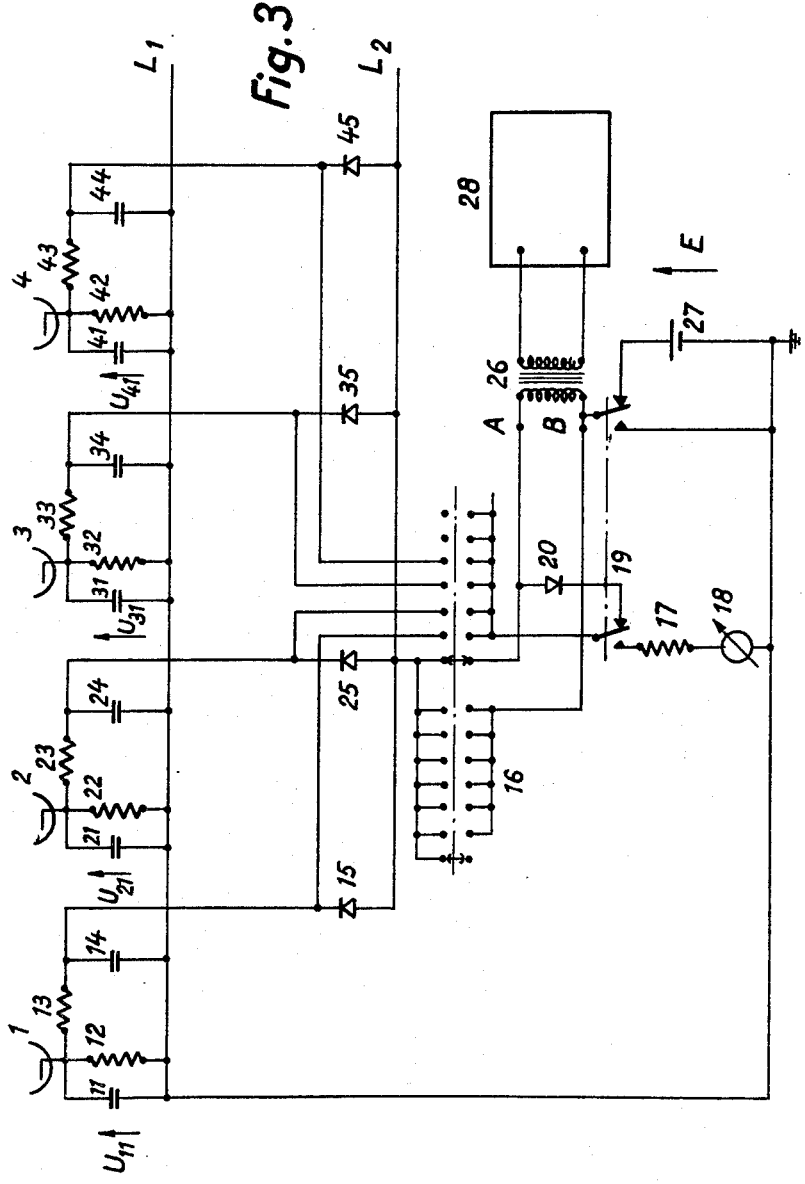

United States Patent Office 2,786,988
Patented Mar. 26, 1957

2,786,988

FAULT LOCALIZING DEVICE IN COMPOSED SYSTEMS

Gustav Ruben Bergman, Hagersten, Sweden, assignor to Telefonaktiebolaget L M Ericsson, Stockholm, Sweden, a corporation of Sweden Application January 17, 1955, Serial No. 482,309

Claims priority, application Sweden January 27, 1954

4 Claims. (Cl. 340—213)

The present invention relates to transmission systems, electron equipments of different kind or other devices composed of electric apparatuses and units, and is particularly intended to simplify and improve in said systems devices and methods for localizing a faulty apparatus or unit, when faults are indicated.

In such composed devices with a number of units comprised therein a continuous control is necessary, so that an arisen fault is immediately indicated, localized and removed. This control or supervision can be made in such a way that faulty or absent function in one of the controlled apparatuses or units causes the relay to be either operated or released, which relay is inter-connected to the apparatus in question and the setting of which is dependent on the function of said apparatus. These relays belonging to each apparatus then actuate a common alarm relay, which thus is actuated as soon as faults have arisen in connection with some apparatus.

Another way to indicate a faulty function is described in Swedish pat. appln. 7205/53 and means that the function of an apparatus is represented by a direct voltage which varies with said function. Said direct voltage can then be applied to a control means so constructed that, if the direct voltage is changed to a certain determined value, a simultaneous, stepwise change of the alternating current impedance between two points in the control means arises. Said points in the control means are then in their turn connected in parallel with an indicating device of any kind.

The number of apparatuses in systems of the above mentioned kind may be rather great owing to the fact that such systems often have a rather complicated structure. When a fault arises, it is of great importance to be able to localize said fault rapidly, and the present invention relates to such a device for fault localization, and it is intended to be operated either manually or automatically, when any fault arises. The device according to the invention for signalling an abnormal function of one or more apparatuses within a group, comprising an indicating device reacting to changes in the alternating current impedance of control means connected to each apparatus in the group, said control means comprising rectifiers, which are actuated by a direct current bias, which is to be controlled, and which are so arranged that small changes in said bias cause stepwise change of the alternating current resistance of the rectifiers, whereby each rectifier with one of its electrodes is connected to said direct current bias and with the other electrode to a reference voltage, is characterized by said indicating device being combined with a fault detector in the form of a selector which over another rectifier by turns connects the controlled apparatuses to said reference voltage.

According to another embodiment of the invention the same indicating means may be used both for indicating a fault which has occurred on the line as for marking the position of the faulty apparatus. In this case the continuous control of the device must, however, be omitted during the time when the fault localization operation takes place.

The invention will now be more closely described in connection with the attached drawings, where Figs. 1 and 2 show block diagrams for two alternative embodiments of the invention and Fig. 3 shows a modified embodiment particularly suitable for systems with electron tubes.

In Fig. 1, 11, 21 . . . etc. designate the apparatuses, which are to be controlled and 12, 22 . . . etc. the control means belonging to said apparatuses. Said control means convert the faulty function of each apparatus into a change of voltage, impedance, or frequency, or in the form of impulses or in some other way and this can be indicated by the indicator 36, to which all apparatuses, over their respective control means and via a common conductor L, are connected. When a fault of any kind arises in any of the apparatuses, the control means in question are actuated, and as the connection to the indicator is equivalent for all control means, the indicator will be actuated. This indicator can suitably be arranged to emit alarm and automatically start a selector or a fualt detector 34, when actuated. Said fault detector may naturally also be arranged to be operated manually. During such a fault localization operation the selector connects one apparatus at a time, and when a faulty apparatus is discovered, an indication in another indicator 37 takes place, said indicator being over a control means 33 connected to the selector. The indicator may have such a shape that the selector stops at a fault indication, or that the selector continues testing all apparatuses but that an impulse is for each discovered fault emitted to a registering means of any kind, for instance a lamp, a writing or stamping means etc. arranged in such a way, that the position of the fault in the fault localization cycle can be fixed. A possibility is to have a counting apparatus actuated by the impulses for stepping the selector, whereby at the end of the fault localization operation the number of the faulty apparatus can be read on the counting apparatus.

Fig. 2 shows a modification of the device according to Fig. 1, at which the same indicator is used both for continuous control and fault localization. All apparatuses are normally over their respective control means connected to the indicator 36. When a fault is indicated, the selector 34 is actuated and the fault localization operation starts and continues in the above mentioned way. In this case the continuous control will, however, be disconnected during the course of the fault localization, and the indicator will over a control means 33 be connected to the selector 34.

In transmission equipments comprising a number of electron tubes it is of the greatest importance to control these tubes continuously and, if a fault in any of said tubes arises, to localize it quickly. In Fig. 3 a special embodiment is shown, which is convenient for control and fault localization of electron tubes. The tubes are designated by 1, 2 . . . The cathodes of these tubes are over a cathode resistance 12, 22 . . . connected to a common line L1. Both condensers 11, 21 . . . and other condensers 14, 24 . . . in series with resistances 13, 23 . . . are connected in parallel with said cathode resistances. The connection points between the condensers 11, 21 . . . and the condensers 14, 24 . . . are over rectifiers 15, 25 . . . connected to a common junction line L2, these rectifiers being so arranged, that current can pass only in the direction towards said connection points. These are besides connected each with its own contact in the selector 16, which is in its turn over a transformer 26 connected with an indicator 28, Moreover the device also comprises a switch 19, by means of which the primary winding of the transformer can be connected either to earth or to a positive voltage E. When localizing faults said switch also connects a voltmeter, on which the direct voltage of the different tubes can then be read.

The operating manner of the present embodiment of the invention is the following: Normally the voltages $U_{11}$, $U_{21}$ ... over the condensers $C_{11}$, $C_{21}$ ... are of the same size, the voltage E lower than said voltages and the rectifiers 15, 25 ... are obstructed, i. e. the alternating current impedance between the points A and B is high. If any of the direct voltages from the electron tubes decreases under the voltage E, the corresponding rectifier will be conductive and the impedance between A and B low. The change of the impedance is indicated by the indicator 28 which gives alarm. The alarm limit, i. e. the value, to which the direct voltage from any electron tube decreases in order to cause alarm, depends on the size of the voltage E. The arrangement may naturally also be made so that alarm is given at too great increase of any direct voltage or as a combination of these both embodiments. The general connection condenser in this case consists of the condensers 11, 21 ... and the circuits comprising the condensers 14, 24 ... and the resistances 13, 23 ... prevent disturbing connection between the different cathodes.

When alarm has been given, the fault localization is started automatically or manually. The selector 16 in this case serves as fault detector and connects an electron tube i. e. one direct voltage at a time over a switch 19, a rectifier 20 and the transformer 26 to the voltage E, at the same time as the continuous control is disconnected. The indicator 28 is arranged in such a way, that it emits an impulse to the selector, so that said selector stops, when the faulty tube has been connected. The direct voltage of said selector may then be measured by the switch 19 being changed from fault localization to voltage measuring. At the same time as the instrument 18 is connected, all the rectifiers are earthed in order that the voltage E will not make a measurment of the direct voltage of the tube impossible.

The examples described above are naturally only some of the embodiments of the invention, which can be thought of within the scope of the invention.

I claim:

1. A supervisory system for indicating and localizing the presence of a fault associated with any one of a plurality of electric devices, said system comprising a first common line, a plurality of networks, each including a first resistance means, a first capacitance means and a second capacitance means all connected in parallel and a second resistance means connected in series between one of said devices and said common line, a second common line, a plurality of circuit means, each connecting the junction point between the second capacitance means and the second resistance means of one network with said second common line and each including a rectifying means oriented to pass current in the direction of the respective junction point, said first common line being arranged to be connected to a source of a bias voltage for blocking all said rectifying means when all said devices are operating normally, fault localizing means having a contact means for each of said devices to be supervised, each of said junction points being connected to a respective one of said contact means, electric indicating means connected to said localizing means in a circuit including a voltage source, said source having a voltage below the bias voltage when all the devices are operating normally, said voltage source being rendered operative for actuating the indicating means in response to the presence of a fault in any of said devices causing a drop of the bias voltage below the voltage of said source and a resulting change in the impedance of the rectifying means, an electric measuring means, switch means for connecting said measuring means to said localizing means and rendering said voltage source inoperative for the purpose aforesaid, and actuating means for the localizing means to connect said second common line and said junction points to said measuring means through successive contact means of the localizing means, the indications of said measuring means for each connected device being indicative of the presence of a fault in the respective device.

2. A supervisory system for indicating and localizing a fault associated with any one of a plurality of electron tubes, said system comprising a first common line, a plurality of networks, each including a first resistance means, a first capacitance means and also with a second capacitance means all connected in parallel and a second resistance means in series between one of said tubes and said common line, a second common line, a plurality of circuit means each connecting the junction point between the second capacitance means and the second resistance means of one network with said second common line and each including a rectifying means oriented to pass current in the direction of the respective junction point, said tubes supplying a bias voltage to said rectifying means through said first common line for blocking the rectifying means when all the tubes operate normally, fault localizing means having a contact means for each of said tubes, indicating means connected in circuit with said contact means, the said circuit including transformer means, a source of positive voltage connected to the circuit including the indicating means, said positive voltage being below the bias voltage when all the tubes operate normally but above said bias voltage in response to the presence of a fault in one of said tubes, a drop of the bias voltage below the voltage of said source effecting a change in the impedance of the rectifying means causing an energization of the indicating means, measuring means, switch means for disconnecting said voltage source from the circuit including the indicating means and connecting the measuring means to said circuit, and actuating means for the localizing means to connect said second common line and said junction points to said measuring means through successive contact means of the localizing means, the indications of said measuring means for each connected tube being indicative of the voltage in the respective tube.

3. A system according to claim 1, wherein the potential of said voltage source is different from the normal operational potential of said electron tubes, said difference in potential controlling the fault level at which said indicating means is activated.

4. A system according to claim 2, wherein said localizing means is manually operable.

References Cited in the file of this patent

UNITED STATES PATENTS

| | | |
|---|---|---|
| 2,547,011 | Jacobsen | Apr. 3, 1951 |
| 2,667,630 | Jorgensen | Jan. 26, 1954 |
| 2,696,603 | Ekman | Dec. 7, 1954 |